United States Patent
Horovitz et al.

(10) Patent No.: US 9,588,879 B2
(45) Date of Patent: Mar. 7, 2017

(54) USABILITY TESTING

(75) Inventors: Yair Horovitz, Mazkeret Batya (IL); Amichai Nitsan, Rehovot (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 173 days.

(21) Appl. No.: 14/001,861

(22) PCT Filed: Mar. 15, 2011

(86) PCT No.: PCT/US2011/028473
§ 371 (c)(1),
(2), (4) Date: Aug. 27, 2013

(87) PCT Pub. No.: WO2012/125157
PCT Pub. Date: Sep. 20, 2012

(65) Prior Publication Data
US 2013/0346950 A1  Dec. 26, 2013

(51) Int. Cl.
*G06F 9/44* (2006.01)
*G06F 11/36* (2006.01)
*G06F 11/34* (2006.01)

(52) U.S. Cl.
CPC ...... *G06F 11/3696* (2013.01); *G06F 11/3438* (2013.01); *G06F 11/3688* (2013.01); *G06F 11/3692* (2013.01); *G06F 11/3466* (2013.01); *G06F 11/36* (2013.01)

(58) Field of Classification Search
CPC ........................................ G06F 11/30–11/3696
See application file for complete search history.

(56) References Cited

U.S. PATENT DOCUMENTS

| | | | |
|---|---|---|---|
| 5,758,062 A | 5/1998 | McMahon et al. | |
| 5,808,908 A | 9/1998 | Ghahramani | |
| 7,093,238 B2 | 8/2006 | Givoni et al. | |
| 7,139,978 B2 * | 11/2006 | Rojewski | G06F 17/30899 |
| | | | 715/738 |

(Continued)

FOREIGN PATENT DOCUMENTS

| | | |
|---|---|---|
| CN | 1238495 | 12/1999 |
| EP | 0687988 | 12/1995 |

(Continued)

OTHER PUBLICATIONS

Sonderegger, Andrea, et al., "The influence of design aesthetics in usability testing: Effects on user performance and perceived usability". 2009, pp. 403-410.*

(Continued)

*Primary Examiner* — Thuy Dao
*Assistant Examiner* — Christopher Franco
(74) *Attorney, Agent, or Firm* — Brooks, Cameron & Huebsch, PLLC

(57) ABSTRACT

Methods, computer-readable media, and systems are provided for usability testing. Usability testing can include recording, via a testing toot, actions of a user of an application and interactions of the user with the application. Usability testing can also include comparing, via the testing tool, the actions and interactions of the user with a baseline flow of actions for the application. Usability testing can include identifying, via the testing tool, a usability problem with the application based on the comparison.

20 Claims, 4 Drawing Sheets

(56) References Cited

U.S. PATENT DOCUMENTS

| | | | |
|---|---|---|---|
| 7,673,287 B2* | 3/2010 | Mayer-Ullmann | G06F 11/3696 717/128 |
| 7,890,806 B2* | 2/2011 | Kwong et al. | 717/124 |
| 7,895,519 B1* | 2/2011 | Allegrezza | G06F 11/3409 715/705 |
| 8,103,913 B2* | 1/2012 | Zambrana | 714/38.1 |
| 8,185,877 B1* | 5/2012 | Colcord | 717/127 |
| 8,495,584 B2* | 7/2013 | Beaty et al. | 717/127 |
| 2003/0164850 A1* | 9/2003 | Rojewski | G06F 17/30899 715/733 |
| 2004/0041827 A1* | 3/2004 | Bischof | G06F 11/3688 715/704 |
| 2005/0021278 A1* | 1/2005 | Potter | G06F 17/30368 702/123 |
| 2005/0278728 A1* | 12/2005 | Klementiev | G06F 11/3414 719/328 |
| 2006/0212540 A1 | 9/2006 | Chon et al. | |
| 2007/0039049 A1* | 2/2007 | Kupferman | G06F 11/3495 726/22 |
| 2007/0083854 A1* | 4/2007 | Mayer-Ullmann | G06F 11/3696 717/124 |
| 2007/0106939 A1* | 5/2007 | Qassoudi | G06F 3/0481 715/704 |
| 2008/0010537 A1 | 1/2008 | Hayutin et al. | |
| 2008/0270998 A1* | 10/2008 | Zambrana | 717/131 |
| 2009/0007078 A1* | 1/2009 | Hoyek | G06F 11/3688 717/131 |
| 2009/0138858 A1* | 5/2009 | Livshits | G06F 11/3419 717/130 |
| 2009/0249300 A1* | 10/2009 | Vainer | G06F 11/3466 717/127 |
| 2009/0254329 A1 | 10/2009 | Thakkar | |
| 2010/0064282 A1 | 3/2010 | Triou et al. | |
| 2010/0095161 A1 | 4/2010 | Giat | |
| 2010/0205530 A1* | 8/2010 | Butin | G06F 9/4446 715/715 |
| 2011/0029957 A1* | 2/2011 | Shufer et al. | 717/127 |
| 2011/0047208 A1 | 2/2011 | Kudou et al. | |
| 2011/0225569 A1* | 9/2011 | Beaty et al. | 717/127 |
| 2012/0011439 A1* | 1/2012 | Karn | G06F 11/3414 715/704 |
| 2013/0290959 A1* | 10/2013 | Beaty et al. | 718/1 |
| 2013/0300744 A1* | 11/2013 | Fulton | G06T 11/206 345/440 |

FOREIGN PATENT DOCUMENTS

| | | |
|---|---|---|
| EP | 1772806 A2 | 4/2007 |
| JP | 2001005690 | 1/2001 |
| JP | 2004013242 | 1/2004 |
| WO | WO-0157706 | 8/2001 |

OTHER PUBLICATIONS

Seffah, Ahmed, et al., "Usability measurement and metrics: A consolidated model", 2006, pp. 159-178.*

Sohaib, Osama, et al., "Integrating Usability Engineering and Agile Software Development", 2010, pp. 32-38.*

Atterer, Richard, et al., "Tracking the Interaction of Users with AJAX Applications for Usability Testing", 2007, pp. 1347-1350.*

Roder, Holger, "Using Interaction Requirements to Operationalize Usability", 2010, pp. 318-319.*

Dwyer, Matthew B., et al., "Analyzing Interaction Orderings with Model Checking", 2004, pp. 1-10.*

Holzinger, Andreas, "Usability engineering methods for software developers", 2005, pp. 71-74.*

Preece, Jenny, "Sociability and usability in online communities: Determining and measuring success", 2001, pp. 1-15.*

Jeffries, Robin, et al., "User interface evaluation in the real world: a comparison of four techniques", 1991, pp. 119-124.*

Dumas, Joseph S., et al., "A Practical Guide to Usability Testing", 2000, pp. 22-183.*

Holland, Corey, et al., "Identifying Usability Issues via Algorithmic Detection of Excessive Visual Search", 2012, pp. 2943-2952.*

Fabo, Pavol, et al., "Automated Usability Measurement of Arbitrary Desktop Application with Eyetracking", 2012, pp. 625-629.*

Korean Intellectual Property Office, International Search Report and Written Opinion, Nov. 2. 2011, 9 pages, Daejeon, Republic of Korea.

Dolunay, B. et al., "Automated End-user Behaviour Assessment Tool for Remote Product and System Testing," Expert Systems with Applications 34.4, Jan. 2008, pp. 2511-2523.

Extended European Search Report received in EP Application No. 11861195.3, Jun. 12, 2015, 8 pages.

Uehling, D. et al., "User Action Graphing Effort (UsAGE)," Conference companion on human factors in computing systems, ACM, Jan. 1995, pp. 290-291.

* cited by examiner

USABILITY TESTING

CROSS-REFERENCE TO RELATED APPLICATION

This application is a U.S. National Stage Application of and claims priority to International Patent Application No. PCT/US2011/028473, filed on Mar. 15, 2011, and entitled "USABILITY TESTING", the entire contents of which is hereby incorporated in its entirety.

BACKGROUND

Computer applications (e.g., computer executable instructions such as software) that are confusing or difficult for users to operate can lead to lost revenue for businesses that employ the applications. For instance, employees using the applications may be inefficient and/or customers using the applications may abandon a transaction and buy from a competitor. Some approaches to testing such applications may have included creating a prototype or working application, setting up a lab including computers and recording devices (e.g., cameras and/or microphones), observing users of the application in the lab, having users perform a set of predefined steps, recording the users in the lab (e.g., with the cameras and/or microphones), and manually analyzing the recorded data. Other information that may have been recorded includes time to complete the predefined steps and number of clicks per task performed. Subsequent analysis of this information (e.g., "click on link 1," "click on button 1" "click on button 2") was done manually (e.g., with reference to a video of the user to see what the user was actually doing).

DETAILED DESCRIPTION

Figure 1:
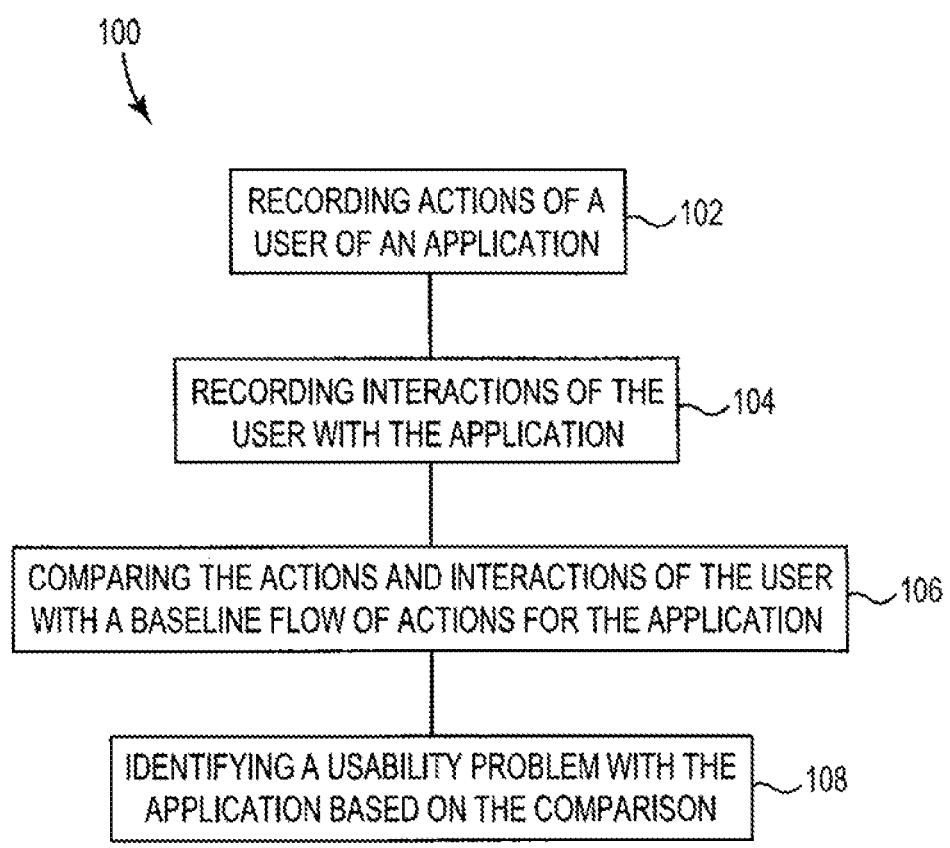
FIG. 1 illustrates a flow chart illustrating an example of a method for usability testing according to the present disclosure.

Methods, computer-readable media, and systems are provided for usability testing. Usability testing can include recording, via a testing tool, actions of a user of an application and interactions of the user with the application. Usability testing can also include comparing, via the testing tool, the actions and interactions of the user with a baseline flow of actions for the application. Usability testing can include identifying, via the testing tool, a usability problem with the application based on the comparison.

The application can be executed instructions (e.g., a computer program) that presents information to a user (e.g., through a user interface). For example, the application can be a website or a standalone program, among other applications. Tasks can be identified to a user of the application to be completed in the application by the user. Examples of such tasks can include purchasing a product from a vendor website or searching for a particular piece of information in a database, among others. The testing tool can be executed instructions, such as a computer program, that runs simultaneously with the application to be tested. However, examples of the present disclosure do not require that the application and the testing tool run on the same machine. Nor is it required that either the application or the testing tool run on the machine that the user is physically using (e.g., the application and/or the testing tool can run remotely from the machine that the user is using).

Usability of the application can be measured by effectiveness, efficiency, and/or satisfaction, among other measurements. Effectiveness of the application can include the accuracy and completeness with which a user can complete a task in a particular environment. Efficiency can include the resources expended in relation to the accuracy and completeness of the completed task. Satisfaction can include the comfort and acceptability of the work of the system, the user, and others affected by its use.

Poor application usability can lead to employee inefficiency, revenue loss due to abandoned transactions or customers switching to a competitor, lower conversion rates (e.g., browse-buy), and a phenomenon where users of an application stay with a prior application or prior version of the application and just enter data into the new application. Examples of the present disclosure can aid in reducing or eliminating these negative effects of poor application usability by identifying problems with application usability and allowing those problems to be addressed.

Furthermore, examples of the present disclosure can provide scalable user testing where no physical observers are required. A user can connect to an application and run a test when it is convenient to the user. Baseline flows can be compared to actual user flows in a side-by-side view. Statistics of user deviations from the baseline flow can be computed and presented for analysis (e.g., a comparison of actions and interactions such as "click on button, select item from list, mouse over widget, select date in calendar, etc," used to complete a task for different users of a particular application and/or a comparison of actions and interactions used to complete a task for a new version of an application relative to an older version of the application). According to some examples of the present disclosure, there is no need to save video and/or audio recordings of user testing because both actions and interactions of the user can be recorded via a testing tool. The actual user flow can be replayed (without media recording during the testing) for later analysis if desired. However, some examples of the present disclosure can use and save video and/or audio recordings of user testing to aid later analysis.

Reference is made to the accompanying drawings, in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, the designators "N" and "P," particularly with respect to reference numerals in the drawings, indicates that a number of the particular feature so designated can be included with one or more examples of the present disclosure.

The figures follow a numbering convention in which the first digit or digits correspond to the drawing figure number and the remaining digits identify an element or component in the drawing. Similar elements or components between different figures may be identified by the use of similar digits. For example, 324 may reference element "24" in FIG. 3, and a similar element may be referenced as 424 in FIG. 4. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates a flow chart illustrating an example of a method 100 for usability testing according to the present disclosure. The method 100 can include recording actions of a user of an application as illustrated at block 102. Actions of the user can include active input to the application via an input device of a machine such as a mouse or keyboard, among others. Active input can include actions such as selecting various objects in the application with the input device (e.g., clicking on an icon), entering text with an input device, and other active input.

The method can include recording interactions of the user with the application as illustrated at block 104. Interactions of the user can include passive input to the application via an input device. Such passive input can include hovering over an object with an input device (e.g., mousing over an icon), selecting a text-entry field without entering text, lingering on a particular portion of the application (e.g., a page or field) without taking an action for a period of time, among other passive input. For example, a user mousing-over may indicate opening of a dialog or a tool-tip, which may indicate that the user is confused and trying to orient himself within the application's interface. Recording such interactions can allow for a much deeper insight into how users perceive the application and to potential problem areas within the application, among other insights, from a usability standpoint.

Recording actions and/or interactions of the user with the application can include recording a name and type of control that the user acted and/or interacted with, the nature of the action and/or interaction, what data was provided by the user (if any) during the action and/or interaction, and a timestamp of the action and/or interaction. For example, a recording could include, "11:09:05 TYPE 'test' in 'SEARCH' TEXTBOX," where "TEXTBOX" is a type of control, "SEARCH" is its name, "TYPE" is the action, and "test" is the value.

The method can include comparing the actions and interactions of the user with a baseline flow of actions for the application as illustrated at block 106. With respect to usability of an application, a flow can include an order and/or timeliness of the actions and/or interactions of a user as the user uses the application (e.g., to complete a particular task). The baseline flow can be defined according to actions and/or interactions of an expert user of the application. An expert user can be a developer of the application or another user. In some examples, defining the baseline flow can include recording actions of the expert user of the application with the same testing tool that is used for other users. The flow of the expert user (e.g., as the expert user completes a particular task) can be saved as the baseline flow for the particular task. In some examples, the baseline flow can be defined by the expert user without the testing tool, where the expert user manually enters a list of actions and/or interactions that comprise the baseline flow for the particular task. In various examples, more than one baseline flow can be defined for a particular task. Some previous approaches may not have included a baseline flow that can be used to ascertain the expected behavior of a user in a more detailed manner than just the expected number of clicks or time to complete a given task.

The baseline flow can be defined according to an aggregated flow of a plurality of users of the application. In such examples, comparing the actions and interactions of the particular user with the baseline flow can include comparing the flow for the particular user with the aggregated flow of other users of the application. Comparing the flow of a particular user to a baseline flow in such examples can allow for identification of deviations from a normalized flow, which may indicate either a more or less efficient flow by the particular user as compared to the aggregate flow, which, in turn, can promote identification of a usability problem with the application (e.g., either for the particular user or for the aggregation of other users).

The baseline flow can be defined according to a baseline flow defined for a previous version of the application (e.g., where the version being tested by the particular user is a new version of the application). The baseline flow for the previous version of the application can be defined as described herein (e.g., according to expert use or aggregated use of other users, among other definitions). Comparing the flow of a particular user to a baseline flow in such examples can allow for discovery of a usability regression between versions. For example, the comparison could reveal that the flow of the new version takes more time and/or more input than the previous version, or the comparison could reveal that a previously remedied usability problem has resurfaced in the new version of the application.

The method can include identifying a usability problem with the application based on the comparison as illustrated at block 108. Examples of usability problems can include ineffectiveness of a flow of the actions of the user to complete an identified task, inefficiency of the flow of the actions of the user to complete the task, and dissatisfaction of the user with the flow of the actions of the user to complete the task, among others.

Identifying the usability problem can include aggregating recorded actions and/or interactions of a plurality of users to identify a portion of the application that resulted in a usability problem for more than a threshold of the plurality of users. For example, the portion of the application can be a particular control, feature, widget, module, routine, graphical user interface, or other portion of the application. The threshold of the plurality of users can be a particular number of users or percentage of the plurality of users. Such a threshold can be defined by a provider of the testing tool and/or application and can be modified as desired.

In some examples, identifying the usability problem can include aggregating recorded actions and/or interactions of a plurality of users to identify an action and/or interaction beyond those of the baseline flow of actions that occurred for more than a threshold of the plurality of users. An example of identifying such a usability problem is described in more detail with respect to FIG. 2. Another example of identifying the usability problem can include identifying a time taken for the user to complete the task that exceeds a threshold time for the baseline flow of actions. For example, if the baseline flow of actions is completed in x time, a threshold t can be added to x, where a usability problem can be indicated if a user takes a time greater than x+t to complete the task. Such a threshold can be defined by a provider of the testing tool and/or application and modified as desired.

In various examples, identifying the usability problem can include aggregating statistics over a plurality of users to highlight the most confusing portions of the application (e.g., the most confusing controls) according to a greatest number of users that had a problem with that portion of the application. The testing tool can identify irrelevant controls used by a greatest number of users. For example, the testing tool could display that 10% of users performed the irrelevant action of "Click on. Find," 23% of users performed the irrelevant interaction "Mouse over Shop," and 42% of users performed the irrelevant interaction of "Mouse over Cart." As used herein, an irrelevant action and/or interaction is an action and/or interaction that the user performs that is not included in the baseline flow for a particular task. Such identification can be provided automatically without requiring an analyst to review the records of testing such as log files and/or video and/or audio recordings.

Other statistics can include flow times, where "Help" was used, flows with the most deviations, and flows with the longest screen distances, among others. Such statistics can allow for analysis by drilling down into the specifics of what controls in the application were confusing and by including the information supplied by users in response to questions presented by the application and/or testing tool as described in more detail herein.

Figure 2:
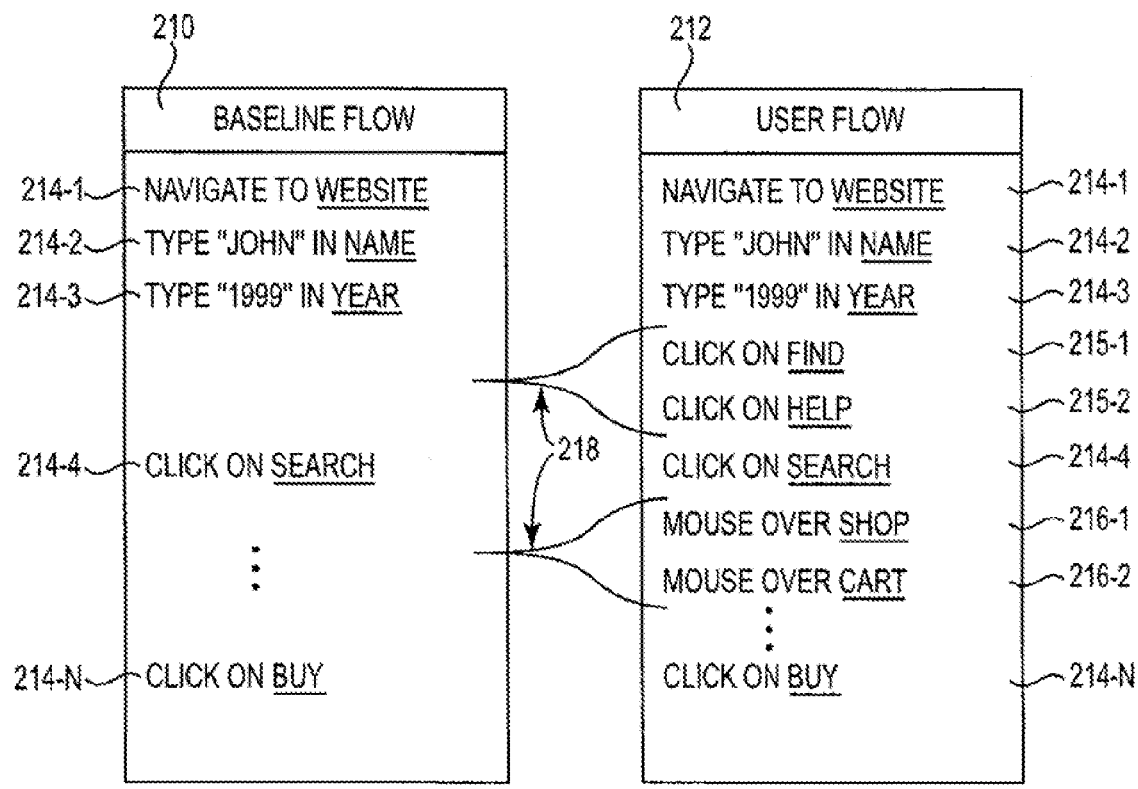
FIG. 2 illustrates a block diagram of an example of a comparison of a user flow with a baseline flow for an application according to the present disclosure.

FIG. 2 illustrates a block diagram of an example of a comparison of a user flow 212 with a baseline flow 210 for an application according to the present disclosure. The baseline flow 210 can include those actions 214-1, 214-2, 214-3, 214-4, . . . 214-N defined to complete an identified task in the application as described herein. In the example illustrated in FIG. 2, the baseline flow 210 includes a first action 214-1 (e.g., "Navigate to Website,") a second action 214-2 (e.g., "Type 'John' in Name,") a third action 214-3 (e.g., "Type '1999' in Year,") a fourth action 214-4 (e.g., "Click on Search,") and an nth action 214-N (e.g., "Click on Buy"). Although not specifically illustrated in the baseline flow 210, the baseline flow 210 can also include interactions of the user such as "Mouse over," for example.

The user flow 212 includes the actions 214 and/or interactions 216 of the user with the application as recorded by the testing tool. For example, in addition to the actions prescribed by the baseline flow 210, the user flow 212 includes a first interaction 216-1 (e.g., "Mouse over Shop") and a second interaction 216-2 (e.g., "Mouse over Cart") between the fourth action (e.g., "Click on Search,") and the nth action (e.g., "Click on Buy"). In some instances, the user will take more actions 215 than are prescribed by the baseline flow 210. For example, in FIG. 2, the user took a first extra action 215-1 (e.g., "Click on Find,") and a second extra action 215-2 (e.g., "Click on Help") between the third action 214-3 (e.g., "Type '1999' in Year.") and the fourth action 214-4 (e.g., "Click on Search").

Comparing the user flow 212 with the baseline flow 210 can include displaying the differences 218 between the flow of the actions of the user (e.g., the user flow 212) and the baseline flow 210. For example, the user flow includes a first extra action 215-1 (e.g., "Click on Find,"), a second extra action 215-2 (e.g., "Click on Help"), a first interaction 216-1 (e.g., "Mouse over Shop") and a second interaction 218-2 (e.g., "Mouse over Cart"), all of which were not included in the baseline flow 210. Accordingly, these differences 218 are displayed in the comparison between the user flow 212 and the baseline flow 210.

Although not specifically illustrated in FIG. 2, the comparison between the user flow 212 and the baseline flow 210 can include an identification of actions of the baseline flow 210 that are not included in the user flow 212. For example, the user may not complete the fourth action 214-4 (e.g., "Click on Search,") In such an example, the comparison can indicate that the user did not complete that action.

Figure 3:
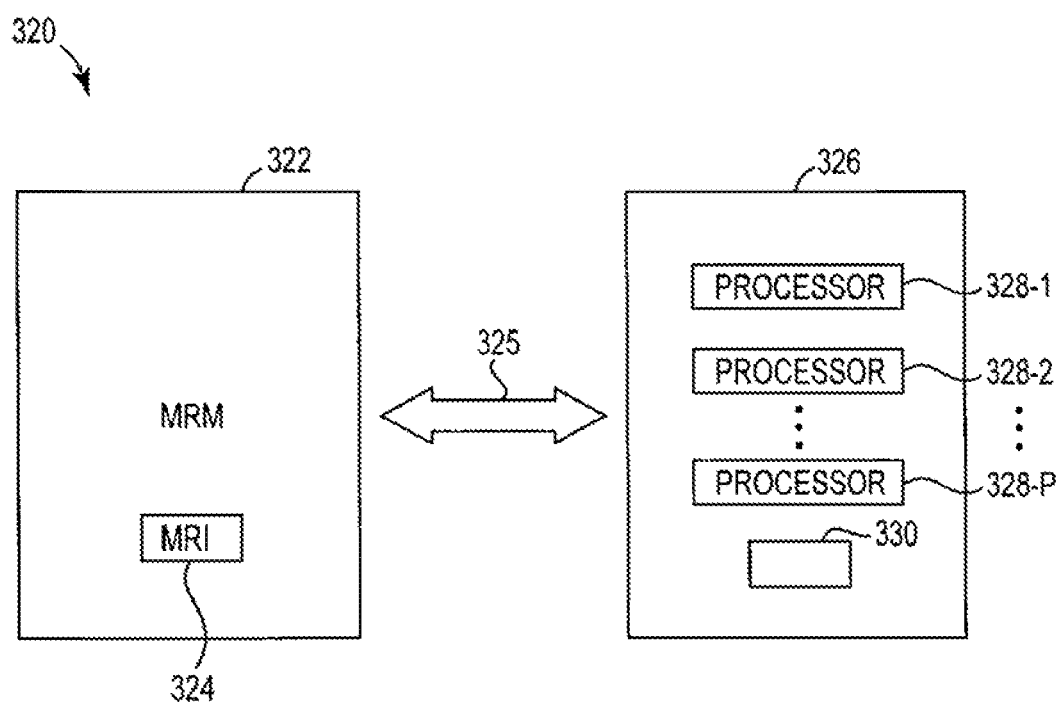
FIG. 3 illustrates a block diagram of an example of a machine-readable medium in communication with processor resources for usability testing according to the present disclosure.

FIG. 3 illustrates a block diagram 320 of an example of a machine-readable medium (MRM) 322 in communication with processor resources 328-1, 328-2 . . . 328-P far usability testing according to the present disclosure. A machine-readable medium 322 can be in communication with a machine 326 (e.g., a computing device) having processor resources (e.g., a number of individual processors 328-1, 328-2 . . . 328-P). The machine 326 can be in communication with, and/or receive a tangible non-transitory MRM 322 storing a set of machine readable instructions 324 executable by the processor resources 328-1, 328-2 . . . 328-P, as described herein. The machine 326 may include memory resources 330, and the processor resources 328-1, 328-2 . . . 328-P may be coupled to the memory resources 330.

Processor resources 328-1, 328-2 . . . 328-P can execute machine-readable instructions 324 that are stored on an internal or external non-transitory MRM 322. A non-transitory MRM (e.g., MRM 322), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, EEPROM, phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), flash memory, etc. as well as other types of machine-readable media.

The non-transitory MRM 322 can be integral, or communicatively coupled, to a computing device, in either in a wired or wireless manner. For example, the non-transitory chine-readable medium can be an internal memory, a portable memory, a portable disk, or a memory associated with another computing resource (e.g., enabling the machine-readable instructions to be transferred and/or executed across a network such as the Internet).

The MRM 322 can be in communication with the processor resources 328-1, 328-2 . . . 328-P via a communication path 325. The communication path 325 can be local or remote to a machine associated with the processor resources 328-1, 328-2 . . . 328-P. Examples of a local communication path 325 can include an electronic bus internal to a machine such as a computer where the MRM 322 is one of volatile, non-volatile, fixed, and/or removable storage medium in communication with the processor resources 328-1, 328-2 . . . 328-P via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 325 can be such that the MRM 322 is remote from the processor resources e.g., 328-1, 328-2 . . . 328-P such as in the example of a network connection between the MRM 322 and the processor resources e.g., 328-1, 328-2 . . . 328-P. That is, the communication path 325 can be a network connection. Examples of such a network connection can include a local area network (LAN), a wide area network (WAN), a personal area network (PAN), and the Internet, among others. In such examples, the MRM 322 may be associated with a first computing device and the processor resources 328-1, 328-2 . . . 328-P may be associated with a second computing device.

The processor resources 328-1, 328-2 . . . 328-P can identify a task for a user to complete in an application. The application can be running on the processor resources 328-1, 328-2, . . . 328-P, or on other processor resources coupled to the processor resources 328-1, 328-2, . . . , 328-P (e.g., via a network connection). The processor resources 328-1, 328-2 . . . 328-P can also record actions and interactions of the user with respect to the application. Furthermore, the processor resources 328-1, 328-2 . . . 328-P can compare the actions and interactions of the user with a baseline flow of actions defined for the application. The baseline flow of actions can be stored in the memory resources 330 associated with the device 326, or in other memory resources coupled to the device 326 (e.g., via a network connection). The processor resources 328-1, 328-2 . . . 328-P can identify a usability problem with the application based on the comparison, as described herein.

Figure 4:
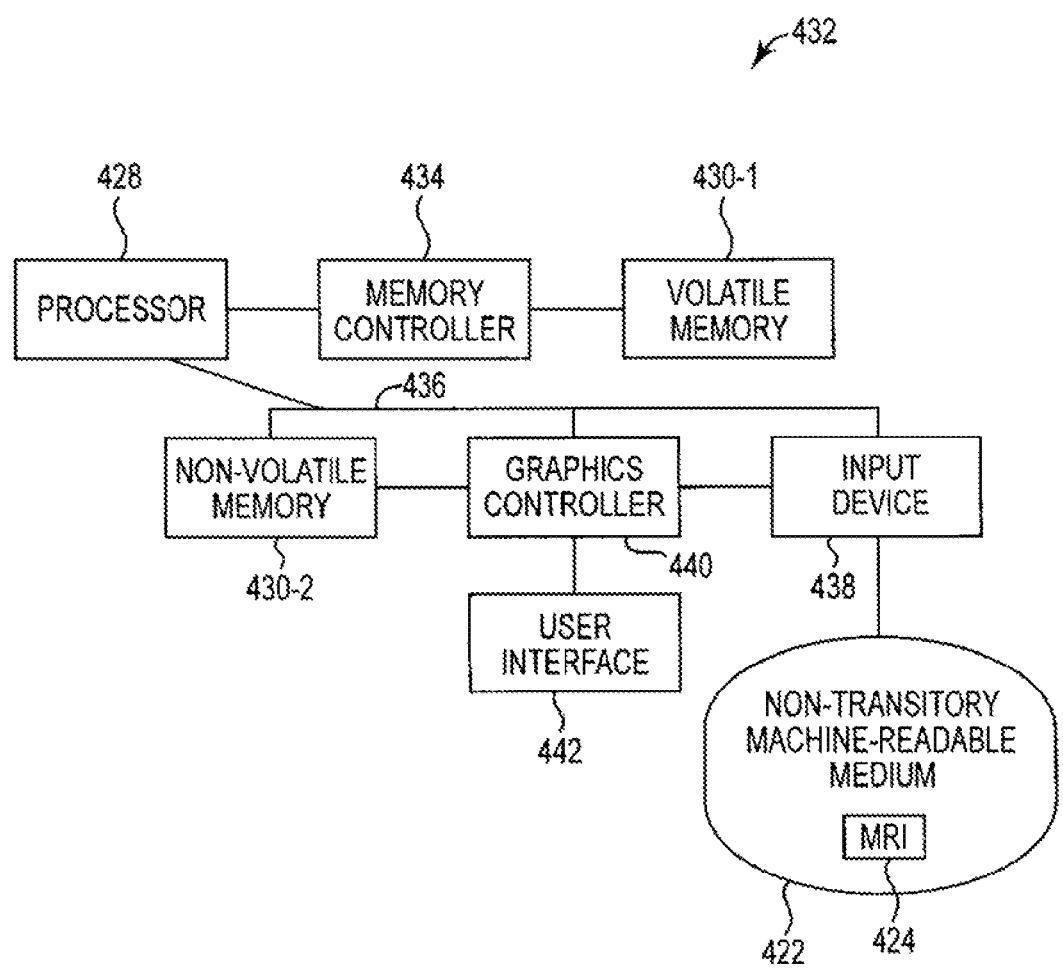
FIG. 4 illustrates a block diagram of an example of a system for usability testing according to the present disclosure.

FIG. 4 illustrates a block diagram of an example of a system 432 for usability testing according to the present disclosure. However, examples of the present disclosure are not limited to a particular system (e.g., computing system) configuration. Furthermore, the use of multiple systems 432 can be employed for usability testing according to the present disclosure. For example, a number of systems 432 can be used for recording user actions and/or interactions with an application being tested and a same or different number of systems 432 can be used for analyzing the recorded information. Examples are not limited to a particular number of systems 432.

The system 432 can include processor resources 428 (e.g., analogous to processor resources 328-1, 328-2, . . . 328-P illustrated in FIG. 3) for executing instructions stored in a tangible non-transitory medium (e.g., volatile memory 430-1, non-volatile memory 430-2, and/or MRM 422). For example, the processor resources 428 can include one or a plurality of processors such as in a parallel processing system. Although not specifically illustrated, the system 432 can include an application specific integrated circuit (ASIC) including logic configured to perform various examples of the present disclosure.

The processor resources 428 can control the overall operation of the system 432. The processor resources 428 can be connected to a memory controller 434, which can read and/or write data from and/or to volatile memory 430-1. The memory controller 434 can include an ASIC and/or a processor with its own memory resources (e.g., volatile and/or non-volatile memory). The volatile memory 430-1 can include one or a plurality of memory modules (e.g., chips). The processor resources 428 can be connected to a bus 436 to provide for communication between the processor resources 428 and other portions of the system 432. The non-volatile memory 430-2 can provide persistent data storage for the system 432.

The system 432 can include memory resources such as volatile memory 430-1, non-volatile memory 43D-2, and/or MRM 424. The memory resources, or some portion thereof, can store a baseline flow of actions defined for an application as described herein. The memory resources can store results of usability testing for one or more users of the application. Connections between the memory resources (e.g., volatile memory 430-1, non-volatile memory 430-2, and/or MRM 424) and the processor resources 428 can be local and/or remote (e.g., via a network connection).

The system 432 can include and/or receive a tangible non-transitory MRM 422 (e.g., analogous to MRM 322 illustrated in FIG. 3) storing a set of machine-readable instructions 424 (e.g., software) via an input device 438. Although not specifically illustrated, the system 432 can include a number of input devices 438, such as a keyboard, mouse, touch screen display, memory reader (e.g., optical memory reader, magnetic memory reader, solid state memory reader, etc.), among other input devices.

The instructions can be executed by the processor resources 428 to identify a task for a user of the application to complete and to record actions and interactions of the user with respect to the application. The instructions can be executed by the processor resources 428 to aggregate the actions and interactions of the user with the results of usability testing (e.g., as stored in the memory resources) for a plurality of users. Instructions can be executed by the processor resources 428 to compare the actions and interactions of various users (e.g., a flow of actions and/or interactions) with the baseline flow. The instructions can also be executed to identify an action and/or interaction beyond those of the baseline flow that occurred for more than a threshold of the plurality of users as indicating a usability problem with the application based on the comparison.

The graphics controller 440 can connect to a user interface 442, which can provide an image to a user based on activities performed by the system 432. For example, instructions can be executed by the processor resources 428 to cause the processor resources 428 to present a question to a user (e.g., via user interface 442) in response to the user not completing a task or in response to the user requesting help completing the task as described herein. The user's response to the question can be used to help identify a usability problem with the application. Instructions can be included with the application and/or testing tool (e.g., by an expert user) to provide guidance to a user who requests help (e.g., with a particular step to compete an identified task).

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

In Detailed. Description, some features are grouped together in a single embodiment for the purpose of streamlining the disclosure. This method of disclosure is not to be interpreted as reflecting an intention that the disclosed examples of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for usability testing, comprising:
recording, via a testing tool, actions of a user of an application;
recording, via the testing tool, interactions of the user with the application, wherein the interactions comprise passive input to the application;
comparing, via the testing tool, an order and timeliness of the actions and interactions of the user with a baseline flow of actions and interactions for the application; and
identifying, via the testing tool, a usability problem with the application based on the comparison.

2. The method of claim 1, wherein the method includes defining the baseline flow according to actions and interactions of an expert user of the application, wherein the baseline flow of actions and interactions is an order and timeliness of the actions and interactions of the expert user.

3. The method of claim 2, wherein defining the baseline flow includes recording, via the testing tool, the actions of the expert user of the application.

4. The method of claim 1, wherein comparing with the baseline includes comparing the actions and interactions of the user with actions and interactions of other users of the application.

5. The method of claim 1, wherein comparing with the baseline includes comparing the actions and interactions of the user with a baseline flow for a previous version of the application to discover a usability regression.

6. The method of claim 1, wherein the method includes identifying to the user, via the testing tool, a task to be completed in the application by the user.

7. The method of claim 1, wherein the actions comprise active input to the application via an input device.

8. The method of claim 1, wherein comparing with the baseline includes displaying differences between the order and timeliness of the actions of the user and the baseline flow of actions.

9. The method of claim 1, wherein identifying the usability problem includes aggregating recorded actions and interactions of a plurality of users to identify a portion of the application that resulted in a usability problem for more than a threshold of the plurality of users.

10. The method of claim 1, wherein identifying the usability problem includes aggregating recorded actions and interactions of a plurality of users to identify an action and/or interaction beyond those of the baseline flow of actions that occurred for more than a threshold of the plurality of users.

11. The method of claim 1, wherein passive input to the application includes hovering over an object via an input device.

12. The method of claim 1, wherein passive input to the application includes selecting a text-entry field without entering text.

13. The method of claim 1, wherein passive input to the application includes lingering in a particular portion of the application without taking an action for a period of time.

14. A non-transitory machine-readable medium having machine-readable instructions stored thereon that, if executed by processor resources, cause the processor resources to:

identify a task for a user to complete in an application;
record actions and interactions of the user with respect to the application, wherein the interactions comprise passive input to the application;
compare an order and timeliness of the actions and interactions of the user with a baseline flow of actions defined for the application; and
identify an efficiency problem with the application based on the comparison.

15. The medium of claim 14, wherein the instructions, if executed by the processor resources, cause the processor resources to present a question to the user in response to the user not completing the task or in response to the user requesting help completing the task.

16. The medium of claim 14, wherein the instructions, if executed by the processor resources, cause the processor resources to identify, based on the comparison, one of:
ineffectiveness of a flow of the actions of the user to complete the task; and
dissatisfaction of the user with the flow of the actions of the user to complete the task.

17. The medium of claim 14, wherein the instructions, if executed by the processor resources, cause the processor resources to identify the efficiency problem by identifying a time taken for the user to complete the task that exceeds a threshold time for the baseline flow of actions.

18. A system for usability testing, comprising:
a machine including a processor;
machine-readable instructions stored in a memory that, when executed by the processor, cause the processor to:
identify a task for a user of the application to complete;
record actions and interactions of the user with respect to the application, wherein the interactions comprise passive input to the application;
aggregate the actions and interactions of the user with results of usability testing for the plurality of users;
compare an order and timeliness of the actions and interactions of the plurality of users with a baseline order and timeliness; and
identify an action and/or interaction beyond those of the baseline order and timeliness that occurred for more than a threshold of the plurality of users as indicating a usability problem with the application based on the comparison.

19. The system of claim 18, wherein the instructions, when executed by the processor, cause the processor to record at least one of:
a name and a type of control of the application with respect to which the user acted;
a nature of the actions;
data provided by the user during the actions; and
a timestamp of the actions.

20. The system of claim 18, wherein the instructions, when executed by the processor, cause the processor to record at least one of:
a name and a type of control of the application with respect to which the user interacted;
a nature of the interactions;
data provided by the user during the interactions; and
a timestamp of the interactions.

* * * * *